United States Patent
Takayanagi et al.

(10) Patent No.: US 6,596,519 B2
(45) Date of Patent: Jul. 22, 2003

(54) PAINT OR INK COMPOSITION

(75) Inventors: Masaaki Takayanagi, Yokohama (JP); Akiko Iguchi, Yokohama (JP); Naoki Gotou, Yokosuka (JP); Kinya Tsuchiya, Yokosuka (JP)

(73) Assignee: The Nisshin Oil Mills, Ltd., Tokyo (JP)

( * ) Notice: Subject to any disclaimer, the term of this patent is extended or adjusted under 35 U.S.C. 154(b) by 0 days.

(21) Appl. No.: 09/884,158

(22) Filed: Jun. 20, 2001

(65) Prior Publication Data

US 2002/0010298 A1 Jan. 24, 2002

Related U.S. Application Data

(63) Continuation of application No. PCT/JP00/00502, filed on Jan. 31, 2000.

(30) Foreign Application Priority Data

Jan. 29, 1999 (JP) ............................................ 11-022535

(51) Int. Cl.$^7$ .................................................. C12P 7/64
(52) U.S. Cl. ................ 435/134; 106/31.35; 106/31.67; 106/31.96; 106/219; 106/243; 435/136; 523/161; 523/404; 523/406; 523/414
(58) Field of Search ................................. 435/134, 136, 435/141, 142, 144, 145, 146, 197, 198; 523/404, 406, 414, 161; 106/31.35, 31.67, 31.96, 219, 243

(56) References Cited

U.S. PATENT DOCUMENTS 4,196,109 A 4/1980 Laganis et al.

FOREIGN PATENT DOCUMENTS

| | | |
|---|---|---|
| GB | 2 005 703 A | 4/1979 |
| JP | 48-51925 | 7/1973 |
| JP | 49-124103 | 11/1974 |

*Primary Examiner*—Robert Dawson
*Assistant Examiner*—D. Aylward
(74) *Attorney, Agent, or Firm*—Burns, Doane, Swecker & Mathis, LLP

(57) ABSTRACT

The present invention provides a modifying agent for resins for paints or resins for inks, containing fatty acids obtained by the enzymatic decomposition of vegetable oils or fats, the resins for paints or resins for inks modified with the modifying agent, and a paint or ink composition containing the resin for the paint or resin for the ink. The paint or ink composition of the present invention has electrodeposition potential or UV curing property and is excellent in the appearance of the paint film, finishing sharpness and adhesion.

21 Claims, No Drawings

PAINT OR INK COMPOSITION

This application is a continuation of International Application No. PCT/JP00/00502 filed on Jan. 31, 2000, which International Application was not published by the International Bureau in English on Aug. 3, 2000

BACKGROUND OF THE INVENTION

The present invention relates to an ambient temperature-drying, baking or aqueous paint and electrodeposition paint composition to be used for the surface processing of automobiles, ships, heavy electric equipments, light electric appliances, construction machines, agricultural machines and domestic electric appliances, or an ink composition to be used for papers, plastics and woods. The paint or ink composition excellent in throwing power, appearance of the paint film, finishing sharpness, adhesion, etc. is obtained by using fatty acids of a vegetable oil obtained by the decomposition of the oil with an enzyme as a modifying agent, curing agent or the like for a resin for paints.

Methods for obtaining fatty acids by decomposing vegetable oils on an industrial scale include Twitchell decomposition method, wherein sulfuric acid is used, developed by Twitchell E. in 1897, a method comprising a combination of high-temperature alkali decomposition, acid decomposition and hot separation [Japanese Patent Unexamined Published Application (hereinafter referred to as "J. P. KOKAI") No. Sho 49-124103] and a continuous high-pressure decomposition method reported by Vitor-Mills in 1935. The fatty acids thus obtained are used as modifying agents for alkyd resins or the like. They are widely used in the fields of paints and inks, taking advantage of the low costs and an excellent build. However, the quality (physical and chemical properties) of those fatty acids is yet satisfactory and unstable because they are colored upon decomposition, the quality of them is deteriorated by a thermal damage and they cannot be highly purified.

In particular, highly reactive polyvalent unsaturated fatty acids such as linseed fatty acids are easily damaged by heat to form trans acids and polymers in the course of the decomposition thereof. Therefore, they are usually purified by the distillation. However, they are not yet satisfactory as starting materials for paints in chromaticity and trans acid content. Further, as the technical innovations are rapidly advancing nowadays, functions required of paints are being enhanced and also the improvement in the functions such as the drape around a substrate, lightening in color and curing property is eagerly demanded.

As for paints for the electrodeposition coating, the reduction in amount of heavy metals (lead and tin) in paints for the cationic electrodeposition coating for motorcars and the development of these paints of low-temperature baking type and high-throwing power type are demanded.

SUMMARY OF THE INVENTION

An object of the present invention is to provide a paint or ink composition excellent in throwing power, appearance of the paint film, finishing sharpness and adhesion, and having electrodeposition potential or ultraviolet curing property.

Another object of the present invention is to provide a resin for paints or a resin for inks, which is capable of providing the above-described excellent paint or ink composition.

Still another object of the present invention is to provide a modifying agent for resins for paints or a modifying agent for resins for inks, which is capable of providing the above-described excellent paint or ink composition.

A further object of the present invention is to provide a process for efficiently producing the above-described modifying agent for resins for paints or modifying agent for resins for inks.

After intensive investigations made for the purpose of attaining the above-described objects, the inventors have found that the throwing power, appearance of the paint film, finishing sharpness and adhesion of a paint or ink composition can be improved by using fatty acids, obtained by decomposing a vegetable oil or fat with an enzyme, as a modifying agent or curing agent for the resin. The present invention has been completed on the basis of this finding.

Namely, the present invention provides a paint or ink composition by containing a resin for paints or a resin for inks obtained by the modification with fatty acids obtained by decomposing a vegetable oil or fat with an enzyme.

The present invention also provides a resin for paints or a resin for inks obtained by the modification with fatty acids obtained by decomposing a vegetable oil or fat with an enzyme.

The present invention further provides a modifying agent for resins for paints or a modifying agent for resins for inks containing fatty acids obtained by decomposing a vegetable oil or fat with an enzyme.

The present invention also provides a process for producing a modifying agent for resins for paints or a modifying agent for resins for inks, which comprises decomposing a vegetable oil or fat with an enzyme to obtain fatty acids.

DESCRIPTION OF THE PREFERRED EMBODIMENTS

The present invention relates to fatty acids obtained by decomposing a vegetable oil or fat with an enzyme and/or a modifying agent for resins for paints or inks containing an oil or fat containing the fatty acids and excellent in water dispersibility, and a paint or ink composition excellent in throwing power, appearance of the paint film, finishing sharpness and adhesion.

In the present invention, the fatty acids usable as the modifying agent for the resins for paints or modifying agent for the resins for inks have a decomposition rate of preferably 5 to 99%, and the vegetable oil or fat is preferably linseed oil. Oils and fats containing the fatty acids have a fatty acid content of preferably 5 to 99% by weight and an index of degree of remaining unsaturation of at least 95. The resin modified with the modifying agent is preferably excellent in water dispersibility. Preferably the paint or ink composition has a modified resin content of 1 to 95% by weight, contains the fatty acids and has an electrodeposition potential.

The paint or ink composition of the present invention contains colorants such as a resin for paints, a coloring pigment, an extender pigment, an anti-corrosive pigment and a dye as the main elements for forming the paint film. The paint or ink composition may further contain, if necessary, secondary elements for forming the paint film such as a plasticizer, a drying agent, a surface controlling agent, an anti-silking agent, a defoaming agent, a rheological controlling agent and an ultraviolet absorber. Fatty acids for the modification, particularly fatty acids having many unsaturated bonds such as linseed fatty acids, can be used as the secondary elements for forming the paint film such as the plasticizer or controlling agents. Further, organic solvents and water are also usable as the secondary elements for forming the paint film, if necessary. The paint or ink composition of the present invention contains the pigment and/or dye in an amount of preferably 2 to 50% by mass, more preferably 10 to 30% by mass.

The paint or ink composition free from the colorant as the main element for forming the paint film is also included in the present invention. For example, clear lacquers composed of only the resin for the paint or ink and of the present invention and a solvent are also included in the paint or ink composition of the present invention. In this case, the solvent content is preferably 5 to 60% by mass, more preferably 30 to 50% by mass.

The paint or ink compositions of the present invention can be classified in various ways. For example, according to the curing (drying) method, they can be classified into ambient temperature-drying paints or inks, baking paints or inks, ultraviolet curing paints or inks and electron beam curing paints or inks. According to the paint film-forming elements, they can be classified into oily paints or inks, synthetic resin paints or inks, aqueous paints or inks and emulsion paints or inks. According to the painting methods, they can be classified into paints or inks for brush coating and those for electrodeposition coating.

An ink of the present invention containing an alkyd varnish, modified with linseed fatty acids, as a vehicle component of the ink is usable as a metal plate ink, lithographic ink, relief printing ink, screen ink or offset overprinting ink.

The paint or ink composition of the present invention can contain the modified resin for paints or inks of the invention in an amount of 1 to 95% by weight, preferably 5 to 90% by weight, more preferably 10 to 85% by weight and most preferably 15 to 50% by weight.

The term "electrodeposition paints or inks" herein indicates the electrodeposition paints and also paints and inks having electrodeposition potential.

The electrodeposition paints and inks are classified into anion type and cation type depending on the mechanisms thereof. When they deposit on the anode, the deposition is called "anionic electrodeposition" and, on the other hand, when they deposit on the cathode, the deposition is called "cathodic electrodeposition". The electrodeposition paints widely used as rust-preventive under coating paints for motorcars and the like are those of cationic electrodeposition type. Resins used for forming the cationic electrodeposition paints are polyaminated resins mainly comprising epoxy resin, acrylic resin, etc. as the skeleton. Usually they are neutralized with an organic acid, they are made dispersible in water and they have a positive charge. When a direct electric current is sent into the paint, the resin deposits on the surface of the cathode to form a paint film. The size and shape of the substance to be painted are not particularly limited so far as at least the surface thereof is made of a conductive metal. The paint is particularly usable for painting a bag-shaped part which is difficult to be painted by brush painting method or spray painting method. In particular, the skeletal resin is usually an epoxy resin of bisphenol A type which can be modified, if necessary, in various ways such as the introduction of a basic group, e.g. amino group, ammonium salt group or sulfonium salt group, modification of the epoxy group with a fatty acid or introduction of $\epsilon$-caprolactone, a fatty acid or the like into a side chain thereof. The curing agents are mainly of urethane curing type which cure hydroxyl group and amino group in the epoxy resin with a block isocyanate.

The term "electrodeposition potential" indicates such a property that a voltage is previously applied in an electrodeposition step to cause an electrochemical reaction and that the curing reaction is not conducted by only heating. The electrodeposition paint or ink composition having the electrodeposition potential can be baked at about 140 to 150° C. which is lower than the baking temperature of ordinary electrodeposition paints of block isocyanate curing type by about 20 to 30° C.

The electrodeposition paint or ink composition of the present invention can contain, if necessary, ordinary paint additives such as inorganic and organic coloring pigments and dyes, e.g. carbon black, titanium white and red iron oxide, extender pigments such as kaolin, talc, calcium carbonate, mica, clay and silica, and rust-preventive pigments such as basic lead silicate, lead phosphate, red lead, zinc cyanide, zinc oxide and strontium chromate. Carbon black and titanium white are particularly preferred. The composition may further contain a curing catalyst, defoaming agent, cissing inhibitor, etc. The composition contains preferably 5 to 40% by weight, more preferably 15 to 25% by weight, of the resin for the paint or resin for the ink of the present invention, preferably 3 to 20% by weight, more preferably 5 to 15%, of the pigment or dye, and preferably 50 to 90% by weight, more preferably 60 to 80% by weight, of the solvent (water or an organic solvent).

The aqueous resin in the electrodeposition paint or ink composition of the present invention is homogeneous because a fatty acid for modifying light-colored resin which is not thermally damaged is used. Therefore, when the resin is dispersed in water, the particle size thereof is small and uniform. Further, it has high stability in an electrodeposition bath, pigment dispersibility, electrodeposition properties, stability of the paint or ink in the electrodeposition tank, paint film-forming property and lightness in color. Accordingly, the electrodeposition paint or ink composition of the present invention is excellent in throwing power, appearance of the paint film and finishing sharpness.

The paint or ink composition of the present invention having the electrodeposition potential is particularly excellent in stability in a paint or ink electrodeposition tank, paint film-forming property and lightness in color.

In a preferred embodiment of the production of the electrodeposition paint or ink, a vegetable oil or fat such as linseed oil is decomposed with an enzyme such as lipase to obtain fatty acids for modifying a resin and then a cationic amino-modified epoxy resin or sulfonium-modified epoxy resin is synthesized. Thus obtained resin for the electrodeposition paint or ink is light-colored and highly transparent. When the resin is dispersed in water, the particle size thereof is small and uniform. Therefore, the electrodeposition paint or ink composition of the present invention is excellent in the stability in an electrodeposition bath, pigment dispersibility, electrodeposition property, paint film-forming property and lightness in color.

The paint or ink composition of the present invention is used for the surface treatment, undercoating, rust inhibition, printing and overcoating of automobiles, large-sized vehicles, ships, heavy electric equipments, light electric appliances, construction machines, agricultural machines, buildings, structures, domestic electric appliances, metal cans, toys, woodworks, furniture and plastic products.

The vegetable oils and fats used in the present invention are drying oils, semidrying oils and nondrying oils containing preferably 40 to 99%, more preferably 50 to 99% and particularly 70 to 99%, based on the whole fatty acids constituting the oils and fats, of fatty acids having two or more unsaturated bonds. Examples of them are hempseed oil, linseed oil, styrax oil, oiticica oil, tung oil, safflower oil, evening primrose oil, sunflower oil, balsam oil, sesame oil, corn oil, soybean oil, cottonseed oil, dehydrated castor oil, tall oil, rapeseed oil, palm oil, palm kernel oil, castor oil, dehydrated castor oil, coconut oil and peanut oil. They can be used either alone or in the form of a mixture of two or more of them. In the present invention, linseed oil, safflower oil, soybean oil, dehydrated castor oil and tall oil are particularly preferred. Among them, linseed oil and soybean oil are recommended. Though they can be used either alone or in the form of a mixture of two or more of them, they are preferably used alone.

The resins to be modified with the fatty acids of the present invention include resins for paints, resins for adhesives, resins for plastics and resins for fibers.

The fatty acids of the present invention are obtained by decomposing vegetable oils and fats with an enzyme. Because the enzymatic decomposition is conducted at a temperature of 100° C. or below (preferably at 30 to 50° C. for 1 to 48 hours), the polymerization and formation of trans acids by heat can be inhibited. This process is suitable for obtaining fatty acids from vegetable oils having many unsaturated bonds such as drying oils and semidrying oils.

In the enzymatic decomposition, fatty acids are decomposed with an enzyme. Unlike ordinary industrial decomposition methods, the decomposition is conducted at a relatively low temperature (usually not higher than 100° C.) and, therefore, thermal damage or coloring of the fatty acids is only slight. The enzymatic decomposition is thus suitable for the decomposition of vegetable oils having a polyvalent unsaturated fatty acid residue and vegetable oils having a hydroxyl group such as castor oil and dehydrated castor oil. Some of the enzymes are specific for the position. Enzymes specific for 1,3-positions of triacyl glycerides and also those specific for 2-position thereof are known. The kinds of the enzymes can be selected depending on the demanded functions. For enhancing the activity of the enzyme, the starting vegetable oil to be decomposed must have a high purity and only a low impurity content. By selecting such a vegetable oil, impurity content of the obtained fatty acids can be kept low.

The enzymes usable for the enzymatic decomposition include lipases, phospholipases and esterases. The lipases are, for example, lipoprotein lipase, monoacylglycerolipase, diacylglycerolipase, triacylglycerolipase and galactolipase. The phospholipases are, lysophospholipase, and phospholipases A1, A2, B, C and D. The esterases are, for example, choline esterase, cholesterol esterase, pectin esterase, tropine esterase, acetylcholine esterase, acetyl esterase, carboxy esterase and aryl esterase. Further, fat-splitting enzymes contained in castor seeds and those extracted from internal organs of animals are also usable. Among them, triacylglycerolipase is preferred.

Microorganisms which produce the enzymes are not particularly limited and they include bacteria, yeast, molds, Actinomyces, etc. In particular, they include Rhizopus, Mucor, Alkaligenes, Candida, etc.

The term "decomposition rate" in the present invention is a value obtained by the following formula:

deposition rate=(actual measurement of neutralization value)/(theoretical neutralization value)×100 (%).

The theoretical neutralization value is a value obtained by the following formula:

theoretical neutralization value=56108/average molecular weight of fatty acids.

The theoretical neutralization value of linolic acid is 200.1, that of linolenic acid is 201.5 and that of linseed fatty acids is about 202. The decomposition rate in the present invention may be 100% (complete decomposition) or it may be controlled, if necessary, at 5 to 99%, preferably 30 to 99%, more preferably 50 to 99% and most preferably 60 to 97%.

Usually, the demanded function is obtained at a decomposition rate of not higher than 99%. Although 100% decomposition rate can be obtained, a decomposition time of 5 times longer and a number of times of the reaction batches of 3 times larger than those necessitated for obtaining 99% decomposition rate are necessitated. When the decomposition rate is 99% or lower, the function equal to that obtained with fatty acids of decomposition rate of 100% can be obtained and, therefore, the production costs including the production time and life of the enzyme can be lowered.

The decomposition rate can be controlled by varying the enzymatic decomposition time and other conditions such as temperature, water content, pH and stirring conditions as well as the kind and amount of the enzyme to be used. From the viewpoint of the operation, the decomposition rate is preferably controlled by varying the enzymatic decomposition time and variety and amount of the enzyme to be used. Some kinds of enzymes are effective in selectively decomposing 1,3-positions of triacyl glycerides and some other kinds of enzymes are effective in selectively decomposing 2-position of them. The enzymes are suitably selected depending on the intended quality of the product.

The decomposition rate can also be controlled by adding oils and fats afterwards.

After the decomposition rate is controlled, the fatty acids contain monoacyl glycerides and diacyl glycerides. The hydroxyl groups in these glycerides are usable as functional groups and also these glycerides are usable as emulsifying agents. The properties of the fatty acids for modifying the resins can be controlled by controlling the decomposition rate of the enzymes. For example, the drying property of the fatty acids can be controlled.

For the purification of fatty acids obtained from vegetable oils by the decomposition with the enzyme, a combination of the adsorption with one or more adsorbents selected from among activated clay, active carbon and silica gel with the distillation at a low temperature is preferred.

The objects and effects obtained by using fatty acids for the paints and resins are as follows: (1) the paint film is crosslinked by the oxidation polymerization, taking advantage of the unsaturated bonds of the fatty acids, (2) the softness and durability are imparted to the paint film by introducing the long-chain aliphatic hydrocarbons, and (3) the solubility of the paint or resin in the solvent is improved or the compatibility with other resins for the paints or inks or with various paint additives is improved and the dispersibility of the pigment is improved. The uses of the fatty acids are roughly classified into a group wherein they are used as the main component for forming the paint film and a group wherein they are used as side component for forming the paint film. When they are used as the main component for forming the paint film, the use of them can be further classified into a group wherein the unsaturated bonds are utilized and a group wherein carboxyl group is utilized.

The fatty acids of the present invention have a high iodine value, a light color, a low trans acid content and only a slight change in the fatty acid composition because the damage thereof by heat is only slight. Another characteristic feature of those fatty acids is a low impurity content thereof. Therefore, the resins for paints containing the fatty acids of the present invention are excellent in water dispersibility and pigment dispersibility, they are light-colored and they have a high thermal stability.

The fats and oils containing the fatty acids of the present invention are vegetable oils and fats containing the fatty acids obtained by the present invention. They can be incorporated into the resins for paints or inks in the same manner as that of the fatty acids. For controlling the emulsifying property, curing property, drying property etc., it is preferred that the oils and fats contain 5 to 99% by weight of fatty acids.

The oils and fats containing the fatty acids can be obtained by incorporating them into fatty acids having the complete decomposition rate, by controlling the decomposition rate at 5 to 99% or by incorporating the oils and fats into the fatty acids.

When the decomposition rate is not complete, the fatty acid contain mono- and diacyl glycerides in addition to the triglycerides. In such a case, hydroxyl groups can be utilized as functional groups or as the emulsifying agent as described above, and also for controlling the curing and drying properties.

The term "oils and fats" herein indicates vegetable oils, animal oils, fatty acids, etc. The oils and fats may contain substances capable of controlling the properties of the resins for paints and inks in addition to the fatty acids. Examples of these substances are triglycerides, diglycerides, monoglycerides, alcohols, hydrocarbons, phospholipids, wax esters and tocopherols.

According to the present invention, the reduction in the degree of unsaturation by the decomposition of the fatty acids, which exerts an influence on the curing and drying properties and which also has been the problem in the prior art, can be inhibited. In other words, the difference between the degree of unsaturation of the starting vegetable oils and fats and that of the fatty acids for modifying resin or that of the oils or fats containing the fatty acids in the present invention can be reduced. Namely, an index of degree of remaining unsaturation calculated according to the following formula must be above a predetermined value:

$$\text{index of degree of remaining unsaturation} = (B/A) \times 100$$

wherein A represents the theoretical iodine value of modifying fatty acids or oil or fat containing the fatty acids calculated from the iodine value of starting oil or fat, and B represents the iodine value of modifying fatty acids or oil or fat containing the fatty acids after the decomposition.

The theoretical iodine value of the fatty acids is higher than the iodine value of the starting vegetable oil because glycerol is removed from the reaction system by the reaction of decomposing the vegetable oil to obtain fatty acids. The mechanism will be described below with reference to linseed oil. When linseed oil has an iodine value of 190, the theoretical iodine value of linseed fatty acids having a degree of decomposition of 100% is about 200. However, the degree of unsaturation is reduced in fact by the decomposition reaction. Therefore, the higher the index of degree of remaining unsaturation, the higher the degree of inhibiting the reduction of degree of unsaturation by the decomposition of fat. Namely, it can be said that when the index of degree of remaining unsaturation is high, the fatty acid can be produced without lowering the function of the starting vegetable oil or fat. The index of degree of remaining unsaturation of the fatty acids or oils and fats containing the fatty acids is at least 95, preferably 95 to 99 and most preferably 98 to 99 for maintaining the function of the startiing material in the present invention.

Because the fatty acids of the present invention are not seriously thermally damaged in the course of the preparation thereof, the lowering in degree of unsaturation thereof is inhibited as described above. Another characteristic feature of these fatty acids is that because trans acids are formed in only a small amount, the change in the fatty acid composition is smaller than that in the starting vegetable oils. The amount of trans acids formed is preferably not larger than 5%, more preferably not larger than 3% and most preferably not larger than 1%. As a result, fatty acids for modifying the resins, which maintain the functions obtained by the fatty acid composition in the starting vegetable oils, can be obtained. Another characteristic feature of these fatty acids is that because they are not seriously thermally damaged, they are light-colored and contain only a small amount of impurities such as unsaponified substances. Accordingly, they are excellent modifiers and curing agents for resins for paints and inks.

The resins modified or cured with the fatty acids of the present invention are excellent in dispersibility in water and pigments, and they are light-colored and stable to heat.

The fatty acids of the present invention can be directly incorporated into the paint or ink composition.

The resins for paints or inks include those usable for preparing oily paints, synthetic paints, aqueous paints and electrodeposition paints. Examples of these resins include polyester resins such as alkyd resins, epoxy resins, acrylic resins, urethane resins, phenolic resins, xylene resins, melamine resins, amino resins, vinyl acetate resins, vinylidene chloride resins, vinyl chloride resins and fluorine resins among them, the polyester resins, epoxy resins, acrylic resins and urethne resins are preferred.

Fatty acid-modified alkyd resins can be obtained by reacting a polyhydric alcohol, a polybasic acid and a fatty acid by an ordinary method. The fatty acid content of the fatty acid-modified alkyd resins is 10 to 70% by weight, preferably 15 to 65% by weight and more preferably 20 to 60% by weight. The polyhydric alcohols usable for the preparation of the fatty acid-modified alkyl resins include, for example, glycerol, trimethylolethane, trimethylolpropane, pentaerythritol, ethylene glycol, propylene glycol and neopentyl glycol. The polybasic acids include, for example, phthalic acid (anhydride) isophthalic acid, terephthalic acid, adipic acid, maleic acid (anhydride), itaconic acid, fumaric acid and tetrahydrophthalic acid (anhydride). The fatty acid-modified alkyd resins are excellent in the drying property at ambient temperature. For further improving the drying property, an amino resin can be used as a curing agent to form an amino resin-modified alkyd resin, an isocyanate can be used to form a urethane-modified alkyd resin and a silicone intermediate can be used to form a silicone-modified alkyd resin. Fatty acid-modified alkyd resins obtained by the copolymerization with a double bond of petroleum compounds such as maleic acid, fumaric acid and acrylic acid are also usable.

The fatty acid-modified epoxy resins are obtained by the esterification of a polyepoxide with a fatty acid by a well-known method. The amount of the fatty acid residue contained in the fatty acid-modified epoxy resin is 10 to 80% by weight, preferably 20 to 75% by weight and more preferably 30 to 70% by weight. The polyepoxides usable for the preparation of the fatty acid-modified epoxy resins include aliphatic ether type diepoxides such as bisphenol-type diepoxides, ethylene glycol diglycidyl ether and polypropylene glycol diglycidyl ether, diglycidyl phthalates and diglycidyl tetrahydrophthalates. Among them, the bisphenol-type diepoxides are preferred. The fatty acid-modified epoxy resins are excellent in the drying property at ambient temperature. For further improving the curing property, the epoxy group of the resin can be subjected to a crosslinking reaction with an organic polyamine or an acid anhydride, or a functional group such as hydroxyl group, amino group or vinyl group can be introduced into the epoxy resin and the resin can be reacted with a curing agent such as an isocyanate or a block isocyanate.

In the modification of the acrylic resin with a fatty acid, it is blended or graft-polymerized with an alkyd resin modified with fatty acids, which can be dried at ambient temperature. The amount of the fatty acid residue contained in the fatty acid-modified acrylic resin is 1 to 50% by weight, preferably 2 to 35% by weight and more preferably 3 to 20% by weight. The acrylate monomers usable for the preparation of the fatty acid-modified acrylic resins are, for example, 2-hydroxyethyl acrylate, 2-ethylhexyl acrylate, t-butylamino acrylate, caprolactam acrylate, N,N-diethylaminoethyl acrylate, tripropylene glycol diacrylate, 1,4-butanediol diacrylate, 1,6-hexanediol diacrylate, polyethylene glycol diacrylate, polypropylene glycol diacrylate, trimethylolpropane triacrylate, pentaerythritol triacrylate, pentaeerythritol tetraacrylate, ditrimethylol propane tetraacrylate and dipentaerythritol hexaacrylate. Those wherein the acrylate is replaced with methacrylate are also included in the acrylate monomers. Acrylate prepolymers usable herein include polyester acrylates, urethane acrylate, epoxy acrylate and melamine acrylate.

The amount of the fatty acid and/or fatty acid-containing oil or fat contained in the resin for the paint or ink of the present invention can be controlled. Further, the properties of the resin for the paint or ink can be controlled by controlling said amount and also by controlling the decomposition rate of the fatty acids in the step of producing the same.

The resin for the paint or ink containing the fatty acid or fatty acid-containing oil or fat of the present invention as the modifying agent or curing agent is excellent in the dispersibility in water or pigment, and they are light-colored and stable to heat. The paint or ink compositions containing the resin for the paint or ink are excellent in throwing power, appearance of the paint film, finishing sharpness, adhesion, etc.

The resins for paints or inks obtained by using the fatty acids of the present invention are usable by an ordinary method. They can be incorporated into paints or inks drying at ambient temperature, baking paints or inks, ultraviolet curing paints or inks, electron beam curing paints or inks and electrodeposition paints or inks. They are particularly suitable for use for clear, white or light-colored paints or inks because the color of them is lighter than that of resins for paints or inks used in the prior art. In addition, the dispersibility of a pigment, which is relatively difficultly dispersible in synthetic resin paints or inks, such as carbon black therein is also high. As a result, a paint film having a clear color can be formed. Further, the resins are excellent particularly in water dispersibility. When the resins are dispersed in water, the particles having a small size are homogeneously dispersed in water. Thus, they are suitable for use for aqueous paints or inks, electrodeposition paints or inks, etc.

The particle size of the water-dispersible resin is an important factor in the dispersion thereof in water. When the particle size of the resin is large or the thermal stability thereof is low, the resin is precipitated and agglomerated. When the particle size is not uniform, the smoothness of the paint film is poor and the intended uniform paint film cannot be obtained. In a direct method for determining the particle size, the particle size distribution is determined. Practically, the storability of the electrodeposition paints and the throwing power for a substance to be coated are employed as the indices.

The resins of the present invention are light-colored and when they are dispersed in water, they have an average particle size of not larger than 0.1 $\mu$m and the amount of the resin sediments is as small as about 1 mg/h. The aqueous dispersions of them have a high storability. Therefore, aqueous cation-type epoxy resins having an excellent electrodeposition property can be provided.

EXAMPLES

The following Examples and Comparative Examples will further illustrate the present invention, wherein percentages are given by weight. The present invention is not limited by the Examples.

In the Examples and Comparative Examples, the following methods were employed for evaluating index of degree of remaining unsaturation, color number (Gardner, APHA), trans acid content, particle size, amount of sediment, painting method, electrodeposition painting method, throwing power, appearance of the paint film, finishing sharpness, stability of electrodeposition paint in electrodeposition tank, drying method and drying time, evaluation of UV curing property, pencil hardness and adhesion.

[Index of Degree of Remaining Unsaturation]
Standard oil and fat analytical test method: 3.3.3 iodine value (wijs-cyclohexane method):
Iodine values of the starting vegetable oil and the fatty acid for modifying the resin or the oil or fat containing the fatty acid are determined. The average molecular weight is calculated from the decomposition rate of the fatty acids for modifying the resin or the oil or fat containing the fatty acids, and the theoretical iodine value is calculated and represented in terms of the percentage based on the found value.

[Color number]
The color number was determined by Gardner and APHA methods.

[Trans acid content]
Standard oil and fat analytical test method: 2.4.4.2 isolated trans isomer:
Methyl ester of a fatty acid was prepared by a predetermined method. The infrared spectrum of the ester was determined. The percentage of the isolated trans isomer calculated as methyl elaidate, based on the sample, was determined according to a predeterminned calculation formula.

[Particle size]
The average particle size·cumulative distribution (50%) ·cumulative distribution (90%) were determined with a laser Doppler particle size determination device (Micro trac UPA, Nikkiso Co., Ltd.).

[Amount of sediment]

The amount of the sediment (mg/h) formed in a unit time was determined with dynometer (BYK Co., Ltd.).

[Painting method]

The paint was applied to a cold-rolled steel plate (PB-3118, Nippon Test Panel Co., 0.3×70×150 mm) to form a 50 mμm thick paint film.

[Electrodeposition painting method]

The electrodeposition painting was conducted with a carbon electrode as the anode and a zinc phosphate-treated plate (Bt 3004, Nippon Test Panel Co., 0.8×70×150 mm) as the cathode under such conditions that the membrane pressure after the baking would be 20 μm.

[Throwing power]

The length of the painted part was measured by the pipe method.

[Appearance of paint film]

Ra was determined with a surfcorder (SE-30D, Kosaka Laboratory Ltd.)

[Finishing sharpness]

PGD was determined with a clarity photometer (PGD-5, Tokyo Koden Co., Ltd.).

[Stability of electrodeposition paint in electrodeposition tank]

The stability of the electrodeposition paint in electrodeposition tank was determined in terms of stable solid remaining rate. The stable solid remaining rate is a ratio (%) of the amount of the solid (resin, pigment, etc.) in an intermediate part of an electrodeposition tank one month after keeping the electrodeposition paint at 35° C. to the amount of the solid immediately after the dispersion.

[Drying method and drying time]

JIS K 5400 6.5

Drying at ambient temperature: The paint was applied to test pieces, and they were left to stand at 25° C. The drying time necessitated for forming the non-adhesive paint film was measured.

UV: Samples were irradiated with ultraviolet rays with an ultraviolet curing means (Handicure 800, Ushio Inc.) for 2 seconds.

[Method for evaluating UV curing property]

The ultraviolet curing property was classified into the following groups:

Drying and curing: After the center of the painted test piece was tightly picked up with the thumb and forefinger, the test piece was free of depressions caused by the fingerprints.

Drying and semicuring: When the center of the painted surface was softly rubbed with a finger, the painted surface was free of a rubbed trace.

Drying realized by touching with a fingertip: When the center of the painted surface was softly touched with a fingertip, the fingertip was not stained.

Drying and uncuring: When the center of the painted surface was softly touched with a fingertip, the fingertip was stained.

[Pencil hardness]

JIS K 5400 8.4 pencil scratching hardness:

The paint film was scratched with a lead of a pencil and, after examining the breakage of the paint film and the state of the scratch, the hardness of the film was represented in terms of the hardness of the lead.

[Adhesion]

JIS K 5400 8.5.3 X cut tape method

The paint film on a test piece was cut with a cutter knife to form an X-shaped wound in such a depth that the knife touched the surface of the test piece. A cellophane adhesive tape was applied to the paint film and then peeled. The adhesion of the paint film to the test piece was examined and classified into groups ranging from 0 (inferior) to 10 (excellent).

Example 1

Preparation Example 1 of Fatty Acids for Modifying Resins 40 parts of ion-exchanged water and 0.1 part of Lipase OF (Meito Sangyo Co., Ltd.) were added to 100 parts of N/B linseed oil (The Nisshin Oil Mills, Ltd.). The decomposition reaction was conducted at 37° C. for 10 hours. After leaving the reaction mixture to stand, water was removed. Ion-exchanged water in the same amount as that of removed water was added to the reaction mixture. The decomposition reaction was continued for about 5 hours. After washing with water, the impurities were removed by the adsorption with activated clay. After the purification by distillation at 200° C., 70 parts of fatty acids for modifying resins, having a decomposition rate of 97%, was obtained.

The index of degree of remaining unsaturation, color number (Gardner) and trans acid content of the obtained fatty acids for modifying resin were determined to obtain the results shown in Table 1.

Example 2

Preparation Example 2 of Fatty Acids for Modifying Resins 40 parts of ion-exchanged water and 0.1 part of Lipase QL (Meito Sangyo Co., Ltd.) were added to 100 parts of N/B linseed oil (The Nisshin Oil Mills, Ltd.). The decomposition reaction was conducted at 37° C. for 5 hours. After leaving the reaction mixture to stand, water was removed. Ion-exchanged water in the same amount as that of removed water was added to the reaction mixture. The decomposition reaction was continued for about 2 hours. After washing with water, the impurities were removed with activated carbon to obtain 80 parts of fatty acids for modifying resins, having a decomposition rate of 60%, was obtained.

The index of degree of remaining unsaturation, color number (Gardner) and trans acid content of the obtained fatty acids for modifying resins were determined to obtain the results shown in Table 1.

Example 3

Preparation Example 3 of Fatty Acids for Modifying Resins 70 parts of fatty acids for modifying resins, having a decomposition rate of 97%, was obtained from 100 parts of soybean oil (The Nisshin Oil Mills, Ltd.).

The index of degree of remaining unsaturation, color number (Gardner) and trans acid content of the obtained fatty acids for modifying resins were determined to obtain the results shown in Table 1.

Comparative Example 1

Comparative Preparation Example of Fatty Acid for Modifying Resins 40 parts of ion-exchanged water, 1.0 part of sulfuric acid and 0.75 part of alkylbenzenesulfonate were added to 100 parts of N/B linseed oil (The Nisshin Oil Mills, Ltd.). The decomposition reaction was conducted at 95° C. for 6 hours. After leaving the reaction mixture to stand, water was removed. Ion-exchanged water in the same amount as that of removed water was added to the reaction mixture. The decomposition reaction was continued for 6 hours. After washing with water followed by drying and purification by distillation at 200° C., 80 parts of fatty acids for modifying resins, having a decomposition rate of 97%, was obtained.

The index of degree of remaining unsaturation, color number (Gardner) and trans acid content of the obtained fatty acids for modifying resin were determined to obtain the results shown in Table 1.

TABLE 1

|  | Ex. 1 | Ex. 2 | Ex. 3 | Comp. Ex. 1 |
|---|---|---|---|---|
| Index of degree of remaining unsaturation (%) | 98.5 | 98.8 | 98.2 | 93.1 |
| Color number (Gardner) | 1 | 1⁻ | 1⁻ | 5 |
| Trans acid content (%) | 0.2 | 0.1 | 0.2 | 5.0 |

It was understood from Examples 1 to 3 and Comparative Example 1 that the fatty acids, for modifying resins, of the present invention have a high index of degree of remaining unsaturation, a low color number and a low trans acid content. This fact indicated that the fatty acids, for modifying resins, of the present invention are not seriously damaged by heat and that they are light-colored and keep the functions of the starting materials even after the decomposition.

Example 4

Preparation Example 1 of Aqueous Fatty Acid-modified Epoxy Resin)

22.1 part of bisphenol A diglycidyl ether-type epoxy resin (EPOTOHTO YD-128, Tohto Kasei Co., Ltd.) having an epoxy equivalent of 187, 28.1 parts of bisphenol A diglycidyl ether-type epoxy resin (EPOTOHTO YD-011, Tohto Kasei Co., Ltd.) having an epoxy equivalent of 475 and 27.6 parts of propylene glycol monomethyl ether were fed into a reaction vessel, and stirred and heated to 100° C. After keeping at 100° C. for 1 hour, the reaction mixture was cooled to 80° C. 7.70 parts of diethylaminopropylamine and 6.22 parts of diethanolamine were added to the reaction mixture, and they were heated to 100° C. After keeping at 100° C. for 2 hours, the reaction mixture was cooled to 80° C. and taken out. Then 8.23 parts of the linseed oil fatty acids obtained in Example 1 and 0.1 part of p-toluenesulfonic acid were added thereto, and they were reacted at 140 to 150° C. for 3 hours to obtain epoxy resin modified with linseed oil fatty acids modified with amine.

The color number (APHA), particle size and amount of sediment of the obtained resin were determined to obtain the results shown in Table 2.

Example 5

Preparation Example 2 of Aqueous Fatty Acid-modified Epoxy Resin

An epoxy resin modified with linseed oil fatty acids modified with amine was obtained in the same manner as that of Example 4 except that linseed oil fatty acids having a decomposition rate of 60% obtained in Example 2 was used.

The color number (APHA), particle size and amount of sediment of the obtained resin were determined to obtain the results shown in Table 2.

Example 6

Preparation Example 3 of Aqueous Fatty acid-Modified Epoxy Resin

An epoxy resin modified with soybean oil fatty acids modified with amine was obtained in the same manner as that of Example 4 except that soybean oil fatty acids having a decomposition rate of 97% obtained in Example 3 was used.

The color number (APHA), particle size and amount of sediment of the obtained resin were determined to obtain the results shown in Table 2.

Comparative Example 2

Comparative Preparation Example of Aqueous Fatty Acid-Modified Epoxy Resin

An epoxy resin modified with linseed oil fatty acids modified with amine was obtained in the same manner as that of Example 4 except that linseed oil fatty acids having a decomposition rate of 97% obtained in Comparative Example 1 was used.

The color number (APHA), particle size and amount of sediment of the obtained resin were determined to obtain the results shown in Table 2.

TABLE 2

|  | Ex. 4 | Ex. 5 | Ex. 6 | Comp. Ex. 2 |
|---|---|---|---|---|
| Color number of resin (APHA) | 20 | 15 | 10 | 85 |
| Average particle diameter (μm) | 0.077 | 0.081 | 0.059 | 0.102 |
| Cumulative distribution 50% (μm) | 0.066 | 0.068 | 0.055 | 0.082 |
| Cumulative distribution 90% (μm) | 0.110 | 0.127 | 0.082 | 0.162 |
| Amount of sediment (mg/h) | 1.1 | 1.2 | 0.8 | 2.1 |

It was understood from Examples 4 to 6 and Comparative Example 2 that the epoxy resins, containing the fatty acids for modifying the resins, of the present invention are light-colored, that the particle size is small and uniform and that the amount of the sediment is small. It was found, therefore, that the resins of the present invention are light-colored and excellent in water dispersibility.

Example 7

Preparation Example of Fatty Acid-modified Alkyd Resin 43.6 parts of phthalic anhydride was reacted with 21.8 parts of glycerol at 180° C. for 5 hours. 40.0 parts of the linseed oil fatty acids having the decomposition rate of 97% obtained in Example 1 were added to the reaction mixture. They were reacted at 220° C. for 10 hours to esterify the free hydroxyl groups, thereby obtaining 100 parts of the alkyd resin modified with linseed oil fatty acids having an oil length of 40%.

The color number (APHA) of the obtained alkyd resin was determined to obtain the results shown in Table 3.

Comparative Example 3

Comparative Preparation Example of Fatty Acid-modified Alkyd Resin

A linseed oil fatty acid-modified alkyd resin was obtained in the same manner as that of Example 7 except that the linseed oil fatty acids having the decomposition rate of 97% obtained in Preparation Example 4 was used.

The color number (APHA) of the obtained alkyd resin was determined to obtain the results shown in Table 3.

TABLE 3

|  | Ex. 7 | Comp. Ex. 3 |
| --- | --- | --- |
| Color number of resin (APHA) | 175 | 250 |

Example 8

Preparation Example of Fatty Acid-modified Acrylic Resin 22.5 parts of methyl acrylate, 26.2 parts of methyl methacrylate and 11.3 parts of methacrylic acid were copolymerized in the presence of 0.15 part of AIBN as the initiator in 60.0 parts of benzene at 45° C. in nitrogen atmosphere. By adding 40.0 parts of the linseed oil fatty acid-modified alkyd resin obtained in Preparation Example 7 as the modifying agent, 100 parts of the alkyd resin-modified acrylic resin was obtained.

The color number (APHA) of the obtained alkyd resin was determined to obtain the results shown in Table 4.

Comparative Example 4

Comparative Preparation Example of Fatty Acid-modified Acrylic Resin

An acrylic resin modified with the linseed oil fatty acid-modified alkyd resin was obtained in the same manner as that of Example 8 except that Twitchell's decomposed linseed oil fatty acid-modified alkyd resin obtained in Comparative Example 3 was used.

The color number (APHA) of the obtained alkyd resin was determined to obtain the results shown in Table 4.

TABLE 4

|  | Ex. 8 | Comp. Ex. 4 |
| --- | --- | --- |
| Color number of resin (APHA) | 125 | 200 |

It was understood from the comparison of Example 7 with Comparative Example 3 and also Example 8 with Comparative Example 4 that the alkyd resin and acrylic resin of the present invention are light-colored.

Example 9

Preparation Example 1 of Electrodeposition Paint (A) Base resin

The epoxy resin modified with linseed oil fatty acids modified with amine in Example 4 was used as the base resin.

(B) Preparation of curing agent 11.6 parts of cyclohexanone, 5.45 parts of toluene and 16.8 parts of ε-caprolactam were stirred and heated to 45° C. and kept at that temperature for 30 minutes. Then 41.5 parts of polymethylenepolyphenyl isocyanate was slowly added to the reaction mixture for the duration of one hour while the temperature was kept at 45° C. The reaction was carried out at 40 to 50° C. for 3 hours. 24.7 parts of ethylene glycol monobutyl ether was dropped therein for the duration of one hour while the temperature was kept in this range. After the completion of the dropping, the temperature was elevated to 100° C. and kept at this point for 2 hours. The reaction mixture was cooled to 80° C. to obtain block isocyanate (B).

(C) Preparation of resin dispersion

A mixture of 66.2 parts of base resin (A) and 33.8 parts of curing agent (B) was thoroughly mixed in a liquid mixture of 3.20 parts of phenoxypropanol as the dispersant, 1.16 parts of formic acid as the neutralizing agent and 380 parts of deionized water as the diluent to obtain an aqueous resin dispersion (C).

(D) Preparation of pigment paste

A mixture of 29.6 parts of base resin (A), 0.62 part of carbon black as a coloring pigment, 31.1 parts of titanium white, 31.1 parts of kaolin as the extender pigment, 0.79 part of dibutyltin oxide as the curing catalyst, 7.6 parts of calcium ferrite as the anticorrosive pigment, 4.14 parts of diethylene glycol monobutyl ether as the dispersant, 0.97 part of formic acid as the neutralizing agent and 90.8 parts of deionized water ad the diluent was thoroughly stirred with Disper Mill to obtain a dispersion. The dispersion was further treated with a horizontal sand mill until the gage particle size of smaller than 10 μm had been obtained to obtain a pigment paste (D).

(E) Preparation of electrodeposition paint 85 parts of resin dispersion (C) was mixed with 15 parts of pigment paste (D) to obtain electrodeposition paint (E) having a resin content of 20%.

The throwing power of the obtained electrodeposition paint and the stability thereof in an electrodeposition tank were evaluated. After the electrodeposition painting followed by the baking at 170° C. for 20 minutes, the appearance of the paint film and finishing sharpness were evaluated to obtain the results shown in Table 5.

Example 10

Preparation Example 2 of Electrodeposition Paint

An electrodeposition paint was prepared by using the linseed oil fatty acids of 60% decomposition rate, obtained in Example 5, in the same manner as that of Example 9 except that phenoxypropanol or diethylene glycol monobutyl ether was not used as the dispersing agent in the preparation of the resin dispersion or pigment paste.

The throwing power of the obtained electrodeposition paint and the stability thereof in an electrodeposition tank were evaluated. After the electrodeposition painting followed by the baking at 170° C. for 20 minutes, the appearance of the paint film and finishing sharpness were evaluated to obtain the results shown in Table 5.

Comparative Example 5

Comparative Preparation Example of Electrodeposition Paint

An electrodeposition paint was prepared by using the epoxy resin modified with linseed oil fatty acids modified with amine obtained in Comparative Example 2 in the same manner as that of Example 9.

The throwing power of the obtained electrodeposition paint and the stability thereof in an electrodeposition tank were evaluated. After the electrodeposition painting followed by the baking at 170° C. for 20 minutes, the appearance of the paint film and finishing sharpness were evaluated to obtain the results shown in Table 5.

TABLE 5

|  | Ex. 9 | Ex. 10 | Comp. Ex. 5 |
|---|---|---|---|
| Throwing property (cm) | 23 | 23 | 20 |
| Appearance of paint film Ra ($\mu$m) | 0.15 | 0.17 | 0.25 |
| Finishing sharpness PGd | 0.7 | 0.7 | 0.5 |
| Stable solid remaining rate (%) | 93 | 88 | 85 |

It is apparent from Examples 9 and 10 and Comparative Example 5 that the electrodeposition paint of the present invention is excellent in throwing power, appearance of the paint film and finishing sharpness. These results indicate that the electrodeposition paint of the present invention is excellent in the resin dispersibility and pigment dispersibility. As for the stability of the paint in the electrodeposition tank, the results mutually related to the resin dispersibility and pigment dispersibility were obtained because the stability is influenced by the agglomeration of the resin and pigment and also by the crosslinking reaction.

In Example 10 wherein no dispersant (phenoxypropanol or diethylene glycol monobutyl ether) was added during the preparation of the resin dispersion and pigment paste, the properties of the obtained paint film were similar to those in Example 9 because the resin contained mono- and diacyl glycerides after the control of the fatty acid decomposition rate.

Example 11

Preparation Example 1 of Electrodeposition Potential Electrodeposition Paint (A) Preparation of base resin 22.1 parts of polyglycidyl ether-type epoxy resin (DER 331J, The Dow Chemical Co.) having an epoxy equivalent of 188, 6.7 parts of bisphenol A, 0.01 part of dimethylbenzylamine and 71.8 parts of xylene were heated at 165° C. for 3.5 hours to carry out the reaction to obtain an epoxy equivalent of 490. 23.5 parts of polyoxyalkylenediamine (Jeffamine D-400, Texaco Chemical Co., Ltd.) and 12.4 parts of xylene were added to the obtained reaction mixture, and the reaction was carried out at 125° C. for 5 hours. Then 17.6 parts of the resin-modifying fatty acids obtained in Example 1, 0.1 part of p-toluenesulfonic acid and 9.3 parts of dimethylaminopropylacrylamide were added to the reaction mixture. After heating at 140 to 150° C. for 3 hours, 15.3 parts of ethyl acetoacetate was added to the reaction mixture. They were heated to 150° C., and the reaction was carried out under heating for about 3 hours while ethanol distilled out was removed from the reaction system. Thus, the epoxy resin modified with linseed oil fatty acids modified with active methylene group-containing amine (epoxy resin A-1) which was a precursor of the base resin was obtained.

Epoxy resin (A-1) was mixed with trimethylolpropane/propylene oxide (6 mols) adduct triacrylate (Aronix M-320, Toagosei Chemical Industry Co., Ltd.) in such amounts that the functional group ratio of active methylene group/α,β-unsaturated carbonyl group would be 1/1. They were stirred at 70° C. for 30 minutes to make the system homogeneous, thereby obtaining the epoxy resin modified with linseed oil fatty acids modified with amine as the base resin (A-2).

(B) Preparation of resin dispersion

An aqueous resin dispersion (B) was obtained from base resin (A-2) in the same manner as that of Example 9 (C).

(C) Preparation of pigment paste 1 part of tetrabutylammonium bromide was added to 100 parts of resin dispersion (B) to obtain pigment paste (C) in the same manner as that of Example 9 (D).

(D) Preparation of electrodeposition potential electrodeposition paint 85 parts of resin dispersion (B) was mixed with 15 parts of pigment paste (C) to obtain an electrodeposition potential electrodeposition paint (E) having a resin content of 20%.

The throwing power of the obtained electrodeposition paint and the stability thereof in an electrodeposition tank were evaluated. After the electrodeposition painting followed by the baking at 140° C. for 20 minutes, the appearance of the paint film and finishing sharpness were evaluated to obtain the results shown in Table 6.

Comparative Example 6

Comparative Preparation Example of Electrodeposition Potential Electrodeposition Paint An electrodeposition potential electrodeposition paint was obtained by using the fatty acids for modifying resins obtained in Comparative Example 1 in the same manner as that of Example 10.

The throwing power of the obtained electrodeposition paint and the stability thereof in an electrodeposition tank were evaluated. After the electrodeposition painting followed by the baking at 140° C. for 20 minutes, the appearance of the paint film and finishing sharpness were evaluated to obtain the results shown in Table 6.

TABLE 6

|  | Ex. 11 | Comp. Ex. 6 |
|---|---|---|
| Throwing power (cm) | 24 | 21 |
| Appearance of paint film Ra ($\mu$m) | 0.13 | 0.30 |
| Finishing sharpness PGd | 0.8 | 0.4 |
| Stable solid remaining rate (%) | 96 | 94 |

It is apparent from Example 11 and Comparative Example 6 that the electrodeposition paint of the present invention is excellent in throwing power, appearance of the paint film and finishing sharpness. These results indicate that the electrodeposition paint of the present invention is excellent in the resin dispersibility and pigment dispersibility. As for the stability of the paint in the electrodeposition bath, the results obtained in Example 11 and Comparative Example 6 were superior to those obtained in Example 9 because the crosslinking reaction of the electrodeposition potential electrodeposition paint does not proceed only by heating.

As compared with the electrodeposition paints in Examples 9 and 10, the electrodeposition potential electrodeposition paint in Example 11 has advantages that the electrodeposition painting can be conducted at a low temperature and that excellent paint film properties can be obtained.

Example 12

Preparation Example of Ambient Temperature-Drying Alkyd Resin Paint

An ambient temperature-drying alkyd resin paint was obtained by adding 2.5 parts of rosin-modified maleic acid resin (melting point: 120 to 130° C.), 2.2 parts of carbon black, 34.3 parts of toluol, 20 parts of xylol, 0.2 part of 6% cobalt naphthenate, 0.2 part of 6% manganese naphthenate and 0.3 part of 24% lead naphthenate to 40.3 parts of the alkyd resin, modified with linseed oil fatty acids, obtained in Example 7.

The obtained ambient temperature-drying alkyd resin paint was used for painting, and the drying time, pencil hardness and adhesion of the paint film were examined. The results are shown in Table 7.

Comparative Example 7

Comparative Preparation Example of Ambient Temperature-drying Alkyd Resin Paint An ambient temperature-drying alkyd resin paint was prepared from the alkyd resin, modified with linseed oil fatty acids, obtained in Comparative Example 3 in the same manner as that of Example 12.

The obtained ambient temperature-drying alkyd resin paint was used for painting, and the drying time, pencil hardness and adhesion of the paint film were examined. The results are shown in Table 7.

TABLE 7

|  | Ex. 12 | Comp. Ex. 7 |
|---|---|---|
| Drying time | 5.5 | 7.0 |
| Pencil hardness | 2H | H |
| Adhesion | 10 | 8 |

It is understood from Example 12 and Comparative Example 7 that the ambient temperature-drying alkyd resin paint of the present invention is excellent in the drying properties and adhesion and has a high pencil hardness. It was found that the drying property is related to the index of degree of remaining unsaturation of the fatty acids in the resin.

Example 13

Preparation Example of Ambient Temperature-drying Acrylic Resin Paint

An ambient temperature-drying acrylic resin paint was prepared by adding 14.2 parts of titanium white, 6.9 parts of toluol, 4.5 parts of xylol, 2.7 parts of butanol, 1.0 part of cellosolve, 0.08 part of 6% cobalt naphthenate, 0.08 part of 6% manganese naphthenate and 0.12 part of 24% lead naphthenate to 70.7 parts of the alkyd resin-modified acrylic resin obtained in Example 8.

The obtained ambient temperature-drying alkyd resin paint was used for painting, and the drying time, pencil hardness and adhesion of the paint film were examined. The results are shown in Table 8.

Comparative Example 8

Comparative Preparation Example of Ambient Temperature-drying Acrylic Resin Paint An ambient temperature-drying acrylic resin paint was prepared from the acrylic resin, modified with linseed oil fatty acids, obtained in Comparative Example 4 in the same manner as that of Example 13.

The obtained ambient temperature-drying acrylic resin paint was used for painting, and the drying time, pencil hardness and adhesion of the paint film were examined. The results are shown in Table 8.

TABLE 8

|  | Ex. 13 | Comp. Ex. 8 |
|---|---|---|
| Drying time | 3.0 | 4.0 |
| Pencil hardness | 3H | 2H |
| Adhesion | 10 | 10 |

It is understood from Example 13 and Comparative Example 8 that the ambient temperature-drying alkyd resin paint of the present invention is excellent in the drying properties and adhesion and has a high pencil hardness. It was found that the drying property is related to the index of degree of remaining unsaturation of the fatty acids in the resin.

Example 14

Preparation Example of UV Curing Paint

A UV curing paint was prepared by adding 5 parts of the linseed oil fatty acids obtained in Example 1, 10 parts of pentaerythritol triacrylate, 20 parts of 2-ethylhexyl acrylate, 10 parts of 2-hydroxyethyl acrylate, 2.5 parts of benzophenone and 2.5 parts of diethylaminoethanol to 50 parts of epoxy acrylate (DRH 303, Shell Chemical Co.).

The obtained UV curing paint was used for painting, and the UV curing property, pencil hardness and adhesion of the paint film were examined. The results are shown in Table 9.

Comparative Example 9

Comparative Preparation Example of UV Curing Paint

A UV curing paint was prepared from the linseed oil fatty acids obtained in Comparative Example 1 in the same manner as that of Example 14.

The obtained UV curing paint was used for painting, and the UV curing property, pencil hardness and adhesion of the paint film were examined. The results are shown in Table 9.

TABLE 9

|  | Ex. 14 | Comp. Ex. 9 |
|---|---|---|
| UV curing property | ◉ | ○ |
| Pencil hardness | 5H | 4H |
| Adhesion | 10 | 8 |

It is understood from Example 14 and Comparative Example 9 that the UV curing paint of the present invention is excellent in the UV drying properties and adhesion and has a high pencil hardness. It was found that the drying property is related to the index of degree of remaining unsaturation of the fatty acids in the resin.

Example 15

Preparation Example of White Baking Ink for Metals 47 parts of the linseed fatty acid-modified alkyd resin obtained in Preparation Example 7 was added to a mixture of 27 parts of titanium oxide, 12 parts of butylated melamine resin (solid content: 60%), 12 parts of No. 100 Solvent and 2 parts of n-butyl alcohol. The obtained mixture was treated with a triple-roll mill to obtain a white baking ink for metals. The obtained ink was used for the screen printing of a steel plate and then baked at 150° C. for 10 minutes. The pencil hardness and adhesion of the printed matter were evaluated. The results are shown in Table 10.

Comparative Example 10

Comparative Preparation Example of White Baking Ink for Metals

A white baking ink for metals was prepared in the same manner as that of Example 15 except that the alkyd resin modified with the linseed fatty acids obtained in Comparative Example 3 was used. The pencil hardness and adhesion of the printed matter were evaluated. The results are shown in Table 10.

TABLE 10

|  | Ex. 15 | Comp. Ex. 10 |
| --- | --- | --- |
| Pencil hardness | 6H | 5H |
| Adhesion | 10 | 8 |

It is apparent from Example 15 and Comparative Example 10 that the white baking ink for metals of the present invention has a high pencil hardness and excellent adhesion to the steel plate. This fact indicates that the alkyd resin modified with linseed fatty acids of the present invention has a high polymerizability and an excellent fitting property to the metal.

What is claimed is:

1. A paint or ink composition containing a resin for paint or resin for ink modified with fatty acids obtained by the enzymatic decomposition of vegetable oils or fats, wherein the fatty acids are those obtained by decomposing 5 to 99% of the vegetable oils or fats with an enzyme.

2. The paint or ink composition according to claim 1, wherein the fatty acids are those obtained by the enzymatic decomposition of linseed oil or soybean oil.

3. The paint or ink composition according to claim 1, wherein the fatty acids have an index of degree of remaining unsaturation of at least 95.

4. The paint or ink composition according to claim 1, which contains 2 to 50% by mass of a pigment and/or a dye.

5. An electrodeposition paint composition containing a resin for paint modified with fatty acids, obtained by the enzymatic decomposition of vegetable oils or fats, a pigment and water, wherein the fatty acids are those obtained by decomposing 5 to 99% of vegetable oils or fats with an enzyme.

6. The electrodeposition paint composition according to claim 5, wherein the fatty acids are those obtained by the enzymatic decomposition of linseed oil or soybean oil.

7. A resin for paint or a resin for ink which is modified with fatty acids obtained by the enzymatic decomposition of vegetable oils or fats, wherein the fatty acids are those obtained by decomposing 5 to 99% of vegetable oils or fats with an enzyme.

8. The resin according to claim 7, wherein the fatty acids are those obtained by the enzymatic decomposition of linseed oil or soybean oil.

9. The resin according to claim 7, wherein the fatty acids have an index of degree of remaining unsaturation of at least 95.

10. A modifying agent for a resin for paint or a resin for ink, which contains fatty acids obtained by the enzymatic decomposition of vegetable oils or fats.

11. The modifying agent according to claim 10, wherein the fatty acids are those obtained by decomposing 5 to 99% of vegetable oils or fats with an enzyme.

12. The modifying agent according to claim 10, wherein the fatty acids are those obtained by the enzymatic decomposition of linseed oil or soybean oil.

13. The modifying agent according to claim 10, wherein the fatty acids have an index of degree of remaining unsaturation of at least 95.

14. A process for preparing modifying agents for resins for paints or resins for inks, which comprises decomposing vegetable oils or fats with an enzyme to obtain fatty acids.

15. The process according to claim 14, wherein 5 to 99% of the vegetable oils or fats are decomposed with an enzyme.

16. The process according to claim 14, wherein the vegetable oil or fat is linseed oil or soybean oil.

17. The process according to claim 14, wherein the vegetable oils or fats are decomposed so that the index of degree of remaining unsaturation of the fatty acids is at least 95.

18. The paint or ink composition according to claim 1, wherein the fatty acids are those obtained by decomposing 50 to 99% of linseed oil and/or soybean oil with an enzyme and wherein the fatty acids have an index of degree of remaining unsaturation of at least 95.

19. The electrodeposition paint composition according to claim 5, wherein the fatty acids have an index of degree of remaining unsaturation of at least 95.

20. The electrodeposition paint composition according to claim 5, wherein the fatty acids are those obtained by decomposing 50 to 99% of linseed oil and/or soybean oil with an enzyme and wherein the fatty acids have an index of degree of remaining unsaturation of at least 95.

21. The resin according to claim 7, wherein the fatty acids are those obtained by decomposing 50 to 99% of linseed oil and/or soybean oil with an enzyme and wherein the fatty acids have an index of degree of remaining unsaturation of at least 95.

* * * * *